United States Patent [19]

Hathaway

[11] Patent Number: 4,744,548
[45] Date of Patent: May 17, 1988

[54] GAS STRUT RETENTION DEVICE WITH L-SHAPED STRUCTURE

[75] Inventor: Richard C. Hathaway, Greenville, Ohio

[73] Assignee: C. R. and I. Inc., Greenville, Ohio

[21] Appl. No.: 876,269

[22] Filed: Jun. 19, 1986

[51] Int. Cl.⁴ .......................... F16F 5/00; F16F 9/32
[52] U.S. Cl. .................... 267/64.12; 92/15;
  188/300; 292/338; 296/76; 403/83; 267/120
[58] Field of Search ............ 188/300, 67; 267/64.12,
  267/120, 124; 292/338, 339, 258, 262–278,
  DIG. 61; 16/84; 296/56, 76; 403/104, 106, 109,
  83; 92/15, 18, 19, 26; 248/351

[56] References Cited

U.S. PATENT DOCUMENTS

| | | | |
|---|---|---|---|
| 3,851,867 | 12/1974 | Fricko | 188/300 X |
| 3,883,126 | 5/1975 | Nicholls | 267/64.12 |
| 4,078,779 | 3/1978 | Mölders | 267/120 |
| 4,449,702 | 5/1984 | Hasegawa | 267/64.12 |
| 4,456,291 | 6/1984 | Brogie | 292/338 |
| 4,634,170 | 1/1987 | Lach | 267/64.12 X |

Primary Examiner—Douglas C. Butler
Attorney, Agent, or Firm—Jerome P. Bloom

[57] ABSTRACT

An apparatus for setting and maintaining a predetermined projected relation of a piston rod of a gas strut or like device with reference to the cylinder unit of which it forms a part having particular application to the support of a hatchback or rear deck closure panel, trunk lid or hood of an automotive vehicle in its open condition comprises a generally L-shaped structure formed to be firm and resistant to deformation save for the longer leg thereof and a limited portion of its shorter leg being provided with a limited capability of lateral flexing. The longer leg of this structure is normally inclined inwardly to and slightly over the shorter leg thereof. The shorter leg provides thereon structure for a simple and quick coupling thereof to a portion of a piston rod in a manner to normally establish the longer leg along and closely adjacent one side of the rod and to provide, when the rod is fully extended from its housing, that at least a portion of the length of the longer leg is directed into a portion of the projected length of the piston rod and there firmly maintained, under which condition the L-shaped structure provides abutment surfaces for respective engagement with the end of the cylinder housing from which the rod projects and a limiting abutment surface provided on the rod outwardly from and in a longitudinally spaced relation to the cylinder.

25 Claims, 1 Drawing Sheet

U.S. Patent May 17, 1988 4,744,548
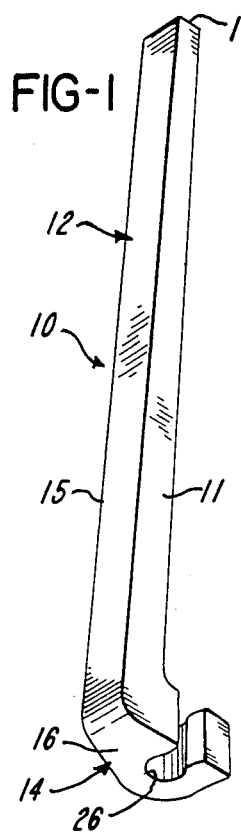
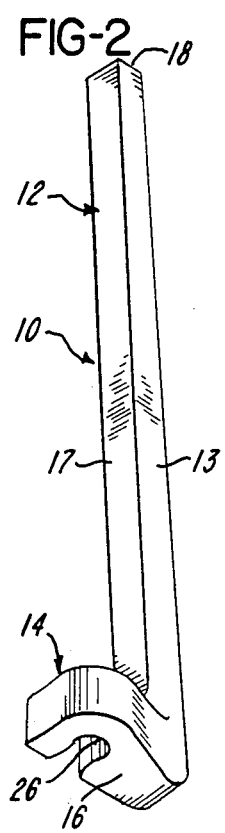
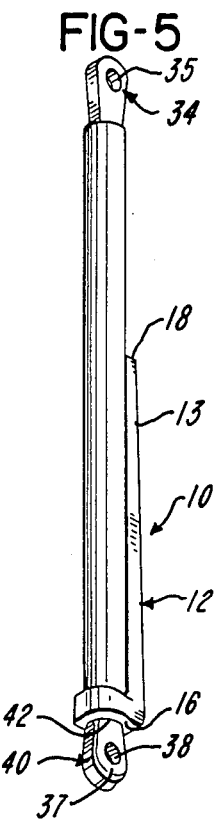
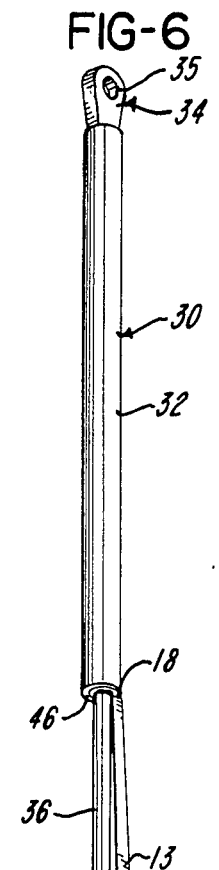
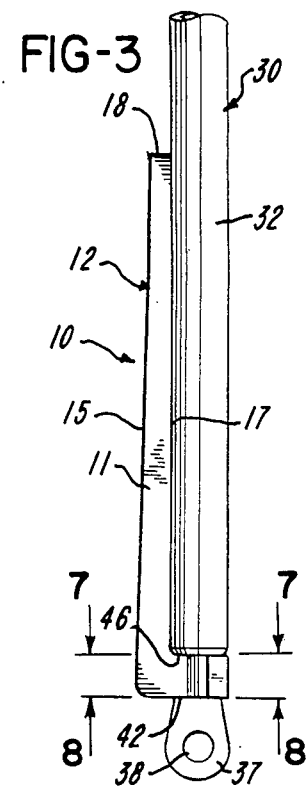
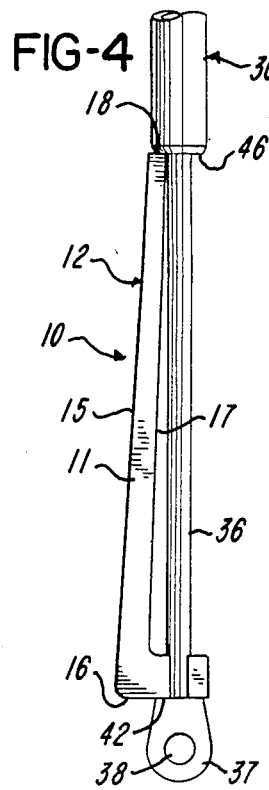
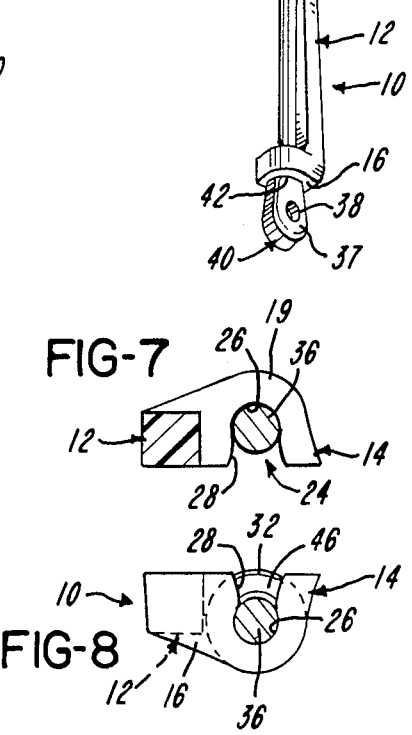

GAS STRUT RETENTION DEVICE WITH L-SHAPED STRUCTURE

BACKGROUND OF THE INVENTION

This invention relates to a new and improved means and method for simply and effectively setting and maintaining a predetermined projected relation of a piston rod of a gas strut or like device with reference to the cylinder unit of which it forms a part. As contrasted to the prior art devices applied for similar purpose, embodiments of the present invention are simpler to fabricate, more efficient and satisfactory in use, positive as to their function, more readily adaptable to a wide variety of applications and maintenance free. Preferred embodiments are durable, simplistic, one piece structures which are inexpensive and easily applied and readily understood by the most untutored of purchasers.

In their most advantageous usage embodiments of the present invention applied to those gas struts and like devices intended to support hatchback and rear deck closure panels, trunk lids and hoods of automotive vehicles in the open condition are capable of minimizing and even eliminating the occurrence of many accidents and injuries that have taken place on unexpected failure of the fluid pressure upon which such devices depend for their intended function.

It should be self-evident from the detailed illustration of a preferred embodiment of the invention which follows that the above enumerated improvements solve and eliminate a number of problems which have existed in the prior art to which the invention relates.

The only prior art within the knowledge of the present inventor or those contributing to this disclosure is represented by the content of the following U.S. Patents:

U.S. Pat. No. 2,996,210 Thomas,
U.S. Pat. No. 3,306,656 Hughes,
U.S. Pat. No. 3,708,825 Wood,
U.S. Pat. No. 3,851,867 Fricko,
U.S. Pat. No. 4,078,779 Moelders.

SUMMARY OF THE INVENTION

Embodiments of the present invention herein set forth comprise a generally L-shaped structure formed to be firm and resistant to deformation save for the longer leg thereof and a limited portion of its shorter leg being provided with a limited capability of lateral flexing. Means in connection with its shorter leg provide for a simple, quick and secure coupling of said generally L-shaped structure to a portion of the length of a piston rod projected from its cylinder which establishes the longer leg of said structure immediately to one side and lengthwise thereof. When the rod is extended from the housing of said cylinder, by reason of the configuration of said L-shaped structure and the means and manner of coupling thereof, means defining at least a portion of the length of said longer leg is directed inwardly to, positioned immediately of and biased against displacement from a surface portion of the projected length of said rod and there maintained until positively displaced. In preferred embodiments of said structure the relation of said longer leg to the shorter thereof will be such that the portion of said longer leg biased against displacement from the piston rod will bias thereto and bear firmly thereon. As so positioned said L-shaped structure, to the extent of its then effective length, blocks the retraction of said rod. As will be seen, said generally L-shaped structure presents end abutment surfaces projecting from, outwardly of and substantially radial to the rod to which it mounts and simply and effectively sets and insures a predetermined projected relation of the piston rod to which it applies, as and when required.

It is preferred that in the application of said L-shaped structure to a piston rod when the latter is appropriately extended the free end of the longer leg thereof is positioned most adjacent and in facing relation and in preferred embodiments of such structure in firm bearing relation to the end of the cylinder housing from which the rod projects.

It is also preferred that the configuration of said generally L-shaped structure be such that the longer leg thereof is arranged to incline inwardly to and slightly over its shorter leg. In particular it is most desirable that embodiments of the invention feature a unitized L-shaped structure wherein the included angle defined between the legs thereof is in a range from about 88 to 84 degrees and that the longer leg of the L-shaped structure is tapered to achieve the aforesaid limited flexibility thereof.

With the foregoing in mind, it is to be understood that it is a primary object of the invention to provide a new and improved apparatus for simply and effectively setting and maintaining a predetermined projected relation of a piston rod of a gas strut or like device with reference to the cylinder unit of which it forms a part having particular advantage for use in insuring support for hatchback and rear deck closure panels, trunk lids and hoods of automotive vehicles in an open condition.

A further object is to provide such apparatus in a manner and form rendering embodiments thereof inexpensive to fabricate, more efficient and satisfactory in use, adaptable to a wide variety of application and unlikely to malfunction.

Another object is to provide said apparatus as a unitary structure which is substantially L-shaped in configuration and formed to be firm and resistant to deformation save for the longer leg thereof and a limited portion of its shorter leg being provided with a limited capability of lateral fixing.

An additional object is to provide such apparatus as a substantially L-shaped structure the longer leg of which is arranged to incline inwardly to and slightly over its shorter leg, the latter of which is formed to facilitate a quick snap fit secured connection of said structure to a piston rod in a direct lateral application thereof.

Another object of the invention is to provide a new and improved means and method for simply and effectively setting and maintaining a predetermined projected relation of a piston rod of a gas strut or like device with reference to the cylinder unit of which it forms a part, having a particularly advantageous application to closure panels, lids and hoods of automotive vehicles, possessing the advantageous structural features, the inherent meritorious characteristics and the means and mode of use herein described.

With the above and other incidental objects in view as will more fully appear in the specification, the invention intended to be protected by Letters Patent consists of the features of construction, the part and combinations thereof, and the means and mode of application and operation as hereinafter described or illustrated in the accompanying drawings, or their equivalents.

BRIEF DESCRIPTION OF DRAWING

Referring to the accompanying drawing wherein is shown one but obviously not necessarily the only form of embodiment of the invention, FIGS. 1 and 2 are perspective views of one embodiment of the invention apparatus taken from respectively opposite angles;

FIGS. 3 and 4 illustrate said embodiment in what may be considered for purpose of this disclosure a front elevation thereof and as coupled to a projected portion of the piston rod of a gas strut or like cylinder dependent on fluid for its control and/or function, the views respectively showing the piston rod in its retracted and projected or extended condition;

FIGS. 5 and 6 are perspective views of the structure of FIGS. 3 and 4 which respectively exhibit the rear elevations thereof;

FIG. 7 is a sectional view taken on line 7—7 of FIG. 3; and

FIG. 8 is a view 8—8 of the base end of the illustrated embodiment of the invention apparatus.

Like parts are indicated by similar numerals throughout the drawings.

The illustrated embodiment of the present invention is a generally L-shaped structure 10 the longer leg 12 of which is normally inclined to and slightly over its short leg 14. The undersurface of the leg 14 and the end of the leg 12 from which it laterally projects defines the base 16 of the structure 10.

It is preferred that the structure 10 be fabricated of a thermoplastic material which is basically firm and resistant to deformation. It should be understood, however, that it is contemplated that it may be desirable for certain applications to incorporate an element or elements of metal within or in connection with the thermoplastic of which the structure 10 is formed. It is possible, but not preferred, to form such structure totally of metal.

Per se the leg 12 has the shape of a generally rectangular elongate bar which as seen in front elevation (FIGS. 3 and 4) is tapered the length thereof and gradually reduced in cross section from its extremity at its base 16 to its opposite extremity 18. Considering the orientation of the structure 10 shown in FIGS. 3 and 4, the front surface 11 and rear surface 13 of the leg 12 are parallel whereas each of its outer side surface 15 and inner side surface 17 are inclined inwardly and over the leg 14 to a very limited degree, each at a different angle to the upper surface of the leg 14. The difference in the angles of inclination of the outer and the inner side surfaces is preferably less than 5 degrees. As thus configured, the leg 12 is rectangular in cross section from essentially its base end to its extremity 18.

The respective extremities of the leg 12 provide definitive abutment surfaces which are used to good advantage, one being defined by the relatively small cross sectional area of the planar end surface of the leg 12 at its extremity 18 and the other by its base surface 16.

The leg 14, which projects to one side of and laterally of the leg 12, at its base end, is shallow in depth and formed with a notch 24 directed inwardly of and opening from its front surface 22, which surface is co-planar with the front surface 11 of the leg 12. As seen in FIGS. 3 and 4, the notch 24 is vertically oriented and centered between the lateral extremities of the leg 14. The form of the notch 24 at its inner end corresponds to that which would be defined by a small diameter vertical bore 26 the central longitudinal axis of which is perpendicular to the base of the leg 14, which is an extension of and forms part of the base 16. The outer or inlet portion 28 of the notch 24 is cut to be inwardly convergent and to have its innermost end open to and radially of the bore configuration 26 which it intersects. The notch 24 will be so dimensioned as to permit a direct and extremely quick, forced, lateral application and press fit of the short leg 14 of the structure 10 to and about a portion of the projected extremity of the piston rod and the particular cylinder to which it applies. The nature of this connection is such to not only provide and maintain a positive coupling of the leg 14 but also a secure, stabilized connection of the entire structure 10 to said rod in a manner to be further described. Attention is directed to FIGS. 3-6 of the drawings in this respect.

In the preferred configuration and construction herein illustrated the included angle between the inner side surface 17 of the leg 12 and the upper surface 19 (FIG. 4) of the leg 14 will preferably be in a range from about 88 to about 84 degrees and will not depart therefrom to any appreciable extent. Thus, the effective angle which the leg 12 defines with the upper surface of the base 14 is an acute angle.

In the example illustrated the degree and direction of the lengthwise taper of the leg 12 is such to lend a portion of the length of this leg which includes its extremity 18 a limited ability to laterally flex relative the remainder thereof. The remainder of the structure 10, including its base, remains firm and substantially rigid as well as non-resilient in character, except in the location of that part of the leg 14 which bounds the inlet portion 28 of the notch 24, which is designed for the snap, press fit secured coupling of the leg 14 to a complementarily sized piston rod. The nature and import of the provision for limited capability of flexing in the areas referred to should be well apparent.

Embodiments of the invention are distinguished by a simplicity and integrity of construction, a long maintenance free operating life, economy in their fabrication, ease in their application and safety in their use. Moreover, in use of the invention embodiments they will be found to be highly resistant to deterioration under any load of the type for which the device is designed.

As first mentioned, embodiments of the invention are particularly advantageous in application to gas struts and like fluid controlled cylinders such as used in automotive vehicles to control and support hatchback and rear deck panels, trunk lids and hoods in the opening and closing thereof. FIGS. 3-6 of the drawings are included to not only illustrate this application but the simplicity and benefits of the use of an embodiment of the invention for this or any similar purpose.

Attention is directed to the fact that the schematic showing of a conventionally constructed gas strut 30, only such details of which as are required for the understanding of the invention are illustrated in FIGS. 3-6, is not intended to indicate a particular orientation of the strut in use but rather a disposition thereof convenient not only for illustration of its basic features but also those of the detail, application and function of the above described exemplary embodiments of the invention. Correspondingly, the particular references to front, back and sides of the herein described invention embodiment and the orientation of the structure of which they form a part must be considered in the frame of reference in which such embodiment is illustrated.

As schematically shown, the cylinder providing the gas strut 30 comprises an elongate cylindrical housing 32, fixed to, projected outwardly from and coaxially of one of which is an adapter 34 having therein an aperture 35. Projected from and outwardly of the opposite end of the housing 32, through a bearing therein, is a portion of the length of a piston rod 36. Fixed to and projecting in part radially outward of the projected extremity of the rod 36 is the base 42 of an adapter 40 a portion of which is in a facing relation to and aligned with the adjacent end of the housing 32. Connected with and projected beyond the base 42 and coaxial with the rod 36 is a connector device 37 having therein an aperture 38 corresponding in nature to that in the adapter 34. The extremity of the housing 32 most adjacent and facing the base of the adapter 40 presents what might be considered for purpose of this disclosure an annular abutment surface 46 which is coaxially aligned with and parallel to the most adjacent facing surface portion of the adapter base 42. The significance of this will soon be obvious and will be readily seen in FIGS. 3-6 of the drawings. As is well known, the end of the piston rod 36 remote from the adapter 40 is fixedly connected to a piston (not shown) which conventionally mounts within and in sealing, bearing relation to the inner wall surface of the housing 32. Within the housing 32 said piston (and indirectly said piston rod) is backed by a charge of gaseous fluid through the medium of which the movements thereof are controlled in known manner.

In conventional use of said gas strut 30, by way of example within an automotive vehicle, whether in connection with a hatchback panel or a trunk lid, the adapter 34 in connection with the cylinder housing 32 is pivotally hinged to a portion of the vehicle body or frame while the connector device 37 is pivotally hinged to a complementary connector element fixedly related to the inner surface of the hatchback or the trunk lid, as may be required. The points of connection of the gas strut to the complementary connector elements on the vehicle body or frame and the hatchback or trunk lid will have a fore and aft alignment. When the hatchback or trunk lid is closed the function of the gas strut 30 is such that it conventionally provides that the rod 36 is forced into the housing 32 and that the gaseous fluid in backing relation to its interconnected piston is pressurized. When a hatchback or trunk lid is opened, the energy stored in the pressurized fluid assists in projecting and maintaining the projected relation of the rod 36 and correspondingly the open condition of the vehicle closure element to which it connects. If for any reason there should be a loss of pressure fluid in the gas strut cylinder when the hatchback or trunk lid controlled thereby is in an open condition, such a closure element would fall, without warning. If at such time a person is engaged in loading or unloading a deck area of the vehicle to which the closure element relates, serious injuries could result. The solution to the significant problem presented thereby is one of the major benefits inherent in use of an embodiment of the present invention, as may be seen with reference to FIGS. 3-6.

Take note in particular of FIG. 4 wherein the piston rod 36 is shown in its fully extended condition, as would be the case at such time as the strut 30 is conditioned, under normal circumstances, to support a hatchback or trunk lid in its open position. Under such a condition, or for that matter at any time prior to the installation of the gas strut, when its piston rod is fully extended, one may simply, easily and quickly achieve an alignment of the opening to the notch 24 with the portion of the projected length of the rod 36 immediately of the adapter 40 whereupon the leg 14 may be quickly, firmly and easily secured by a forced, lateral application and pressured fit thereof to this portion of the rod. The nature of this connection is such to not only provide and maintain a positive coupling of the leg 14 but also a secure, stabilize connection of the entire structure 10 to said rod.

When the leg 14 is snap fit and securely coupled about the projected end of the rod 36 as described, the base 16 of the structure 10 will effectively abut the surface 43 of the adapter 40. As will be seen, the design of the L-shaped structure 10 and the angle of inclination of the inner side surface 17 of the leg 12 to and over the surface 19 of the leg 14 dictates that what is shown to be the upper end portion of the surface 17 is biased to the adjacent facing side portion of the rod 36 immediately of the abutment surface 46 of the cylinder housing 42, simultaneously with which the surface defining the upper or outer extremity 18 of the leg 12 bears in facing abutted relation to the surface 46. As should be obvious, the structure 10, the length of its leg 12 and the included angle which it defines with the leg 14 will be determined by the length of that portion of the piston rod which projects from the housing 32 when the gas strut 30 is in its operative supporting condition.

Not only should it now be adequately clear how simply and effectively the structure 10 may be applied to prevent a collapse of a cylinder such as the strut 30, but it should also be self evident there is a significant integrity and insurance provided in the form and construction of the structure 10 in application to control cylinders such as the strut 30. The construction and arrangement of the structure 10 provides a retention device which affords a significant load bearing capacity for the purpose intended.

Once the device 10 is installed and utilized as described and the lid or hatchback to which the gas strut relates is required to be closed, the upper end portion of the leg 10 must be physically and forcibly displaced the very limited radial distance required for it to clear the end 46 of the housing 32 to permit this procedure. As pressure is applied to commence the closing procedure and the flexed extremity of the leg 10 overlaps the immediate end of the housing 32, the leg 12 is released to firmly and tightly bear on and to the outer surface of the housing as the rod is retracted. Accordingly, when the closure element to which the strut 30 is applied is next opened, the extremity 18 of the leg 12 will automatically snap under and in front of the end 46 of the housing 32 to insure against its subsequent inadvertent or accidental closing.

Note must also be made of the fact that in use of the structure 10 the leg 14 thereof will always interpose between the surface 46 and base of the adapter 40 on the retraction of the rod 36.

In summary, it can be said that various preferred embodiments of the invention are illustrated by the following characterizations thereof:

(a) Apparatus for application to a projected portion of the piston rod of a gas strut or like control cylinder to limit or prevent its retraction into the housing of the cylinder of which it forms a part, as and to the extent required, comprising a generally L-shaped structure the surface of the longer leg of which most adjacent the shorter leg thereof is inclined to and over said shorter leg to define therewith an acute angle, said shorter leg having in connection therewith means for a secure connection thereof in a substantially radially projected relation to a portion of a length of a piston rod which is projected from the housing of a control cylinder of which it form a part, said legs having a connection therebetween providing a relative disposition thereof which in the secured connection of said shorter leg to the piston rod to which it applies inherently positions said longer leg to extend lengthwise of, alongside and immediately adjacent to the rod and to have at least a portion thereof substantially in contact with the facing surface of the rod when said rod is sufficiently extended, said generally L-shaped structure presenting longitudinally spaced surface portions thereof which in the application of said structure to the rod, when said rod is sufficiently extended, are positioned in line with the end surface of the housing from which the rod projects and by reason of the secured connection thereof to the rod limits the movement of its projected portion into the cylinder housing.

(b) Apparatus for maintaining a predetermined projected relation of a piston rod of a gas strut or like control cylinder with reference to the housing of the cylinder of which it forms a part, as and to the extent required, having a particularly advantageous application to closure panels of automotive vehicles comprising a generally L-shaped structure which is firm and resistant to deformation but distinguished by the longer leg thereof having a limited capability of flexing outwardly from its shorter leg, means in connection with said shorter leg to provide a secure coupling thereof to a portion of a piston rod projected outwardly from the housing of a cylinder of which it forms a part, said coupling means being so disposed with reference to said legs to set said longer leg of said generally L-shaped structure immediately of and along one side of a piston rod to which said shorter leg is coupled, said generally L-shaped structure as so constructed providing at least portions thereof in line with the end of the housing from which said rod projects for selectively maintaining the piston rod in a selectively projected relation to its housing.

(c) Apparatus for application to a projected portion of the piston rod of a gas strut or like control cylinder to limit or prevent its retraction into the housing of the cylinder of which it forms a part, as and to the extend required, comprising means defining a bar shaped element having in connection therewith means defining a lateral projection therefrom spaced longitudinally from one end thereof, said last named means having in connection therewith means for the connection thereof to a portion of the length of the piston rod of a control cylinder which is projected outwardly from one end of its housing to be stably positioned thereby in a laterally projected relation to such rod, the connection of said means defining said bar shaped element to said means defining said lateral projection therefrom and the relative orientation and disposition with respect thereto of said means for connection of said lateral projection to said rod being such to inherently provide that said bar shaped element positions substantially lengthwise and immediately of the rod in a condition that it is biased thereto, said generally L-shaped structure being thereby conditioned to provide, selectively, for a selective maintenance of a selective degree of projection of the rod from said housing.

(d) Apparatus for application to a projected portion of the piston rod of a gas strut or like control cylinder to limit or prevent its retraction into the housing of the cylinder of which it forms a part, as and to the extent required, comprising a generally L-shaped structure, the shorter leg of which has in connection therewith means for a secure connection thereof in a substantially radially projected relation to a portion of a length of a piston rod which is projected from the housing of a control cylinder of which it forms a part, said means for a secure connection of said shorter leg to a piston rod being defined by a notch in said shorter leg so formed that in the application thereof to said rod it may be connected thereto with a pressured press fit, said legs having a connection therebetween providing a relative disposition thereof which in the secured connection of said shorter leg to the piston rod to which it applies inherently positions said longer leg to extend lengthwise of, alongside and immediately adjacent to the rod, and when the rod is sufficiently extended from said housing, to have at least a portion thereof substantially in contact with the facing surface of the rod, said L-shaped structure providing longitudinally spaced surface portions thereof which in the application of said structure to the rod are positioned in line with the end surface of the housing from which the rod projects and by reason of the secured connection thereof to the rod provide selective limits to the movement of the rod into its housing.

Accordingly, the objectives of the invention have been achieved as herein described, not only with respect to the safety inherent in use of embodiments thereof but the ease of their use and application and the making available to the public of extra insurance in areas such as noted in an extremely inexpensive fashion.

From the above description it will be apparent that there is thus provided a device of the character described possessing the particular features of advantage before enumerated as desirable, which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. Apparatus for application to a projected portion of the piston rod of a control cylinder to selectively limit its retraction into the housing of the cylinder of which the rod forms a part comprising a structure which has a substantially L-shaped configuration as applied to a control cylinder, said structure comprising means defining a short leg and a relatively longer linearly directed leg, said means defining said short leg including means for a secure connection thereof in a substantially radially projected relation to a portion of the length of a piston rod which is projected from the housing of a control cylinder of which it forms a part, thereby to couple said longer leg to the piston rod, said legs having a connection therebetween providing a relative disposition thereof which in the secured connection of said shorter leg to the piston rod to which it applies inherently adapts said longer leg to position lengthwise of, alongside and immediately adjacent to the rod and to have at least a portion thereof substantially in bearing contact with the facing surface of the rod when said rod is sufficiently extended, said generally L-shaped structure presenting longitudinally spaced surface portions thereof which in the application of said structure to the rod, when said rod is sufficiently extended, are positioned in line with the end surface of the housing from which the projects and by reason of the secured connection thereof to the rod limits the movement of its projected portion into the cylinder housing.

2. Apparatus as in claim 1 wherein said longer leg has the general shape of a bar which is substantially rectangular in cross section and the extremity of said bar remote from said shorter leg presents a limiting abutment surface which in the said connection of said structure to the rod positions in facing relation to the end of the cylinder housing from which the rod projects while said shorter leg which connects to the rod is remote therefrom.

3. Apparatus as in claim 1 characterized in that one extremity of said longer leg presents a limiting abutment surface which in the said connection of said structure to the rod, when the rod is projected outwardly of its housing a predetermined amount, positions in facing relation to the end of the cylinder housing from which the rod projects and said short leg is at the end of said longer leg remote therefrom.

4. Apparatus as in claim 3 wherein said L-shaped structure is formed to be firm and generally resistant to deformation and distinguished by said longer leg thereof having a limited capability of lateral flexing sufficient to clear the facing end of the housing of the cylinder from which the piston rod projects.

5. Apparatus as in claim 3 characterized in that said longer leg has a taper along the length thereof, at least in part, to the end thereof remote from said shorter leg.

6. Apparatus as in claim 1 characterized in that said means for secure connection of said shorter leg to a piston rod is formed for a pressured snap fit coupling thereto.

7. Apparatus as in claim 1 wherein said L-shaped structure provides a body which is firm and resistant to deformation save for said longer leg thereof and a limited portion of its shorter leg which have a limited capability of flexing.

8. Apparatus for effecting and maintaining a predetermined projected relation of a piston rod of a control cylinder with reference to the housing of the cylinder of which it forms a part having a particularly advantageous application to closure panels of automotive vehicles comprising a substantially L-shaped structure which is firm and resistant to deformation and distinguished by the longer leg thereof having a limited capability of flexing outwardly from its shorter leg, means in connection with said shorter leg to provide a secure coupling thereof to a portion of a piston rod projected outwardly from the housing of a cylinder of which it forms a part, said coupling means being so constructed and disposed with reference to said legs that in the coupling thereof to the piston rod, with the rod in a predetermined outwardly projected relation to the end of the housing from which it projects, to set said longer leg of said generally L-shaped structure immediately of and along one side of the piston rod, said substantially L-shaped structure being so constructed to provide at least portions thereof in line with the end of the housing from which said rod projects to maintain the piston rod in a selectively projected relation to its housing until such time said longer leg is physically displaced, at least in part, to permit the retraction of the rod from said selectively projected position thereof.

9. Apparatus as in claim 8 characterized in that said longer leg of said generally L-shaped structure is formed to have at least a portion thereof biased into a firm bearing relation to said rod when said secure coupling of said shorter leg is achieved and the rod to which it is coupled to sufficiently extended from the housing of the cylinder of which it forms a part.

10. Apparatus for application to a projected portion of the piston rod of a control cylinder to limit or prevent its retraction into the housing of the cylinder of which it forms a part comprising means defining a bar shaped element having in connection therewith means defining a lateral projection therefrom spaced longitudinally from one end thereof, said last named means having in connection therewith means for the connection thereof to a portion of the length of the piston rod of a control cylinder which is projected outwardly from one end of its housing to be stably positioned thereby in a laterally projected relation to such rod, the connection of said means defining said bar shaped element to said means defining said lateral projection therefrom and the relative orientation and disposition with respect thereto of said means for connection of said lateral projection to said rod being such to inherently position said bar shaped element substantially lengthwise and immediately of the rod in a condition that it is biased thereto along the length thereof, said generally L-shaped structure being thereby conditioned to provide for a selective maintenance of a selective degree of projection of the rod from said housing, said bar shaped element being constructed and arranged to have substantially the length thereof displaced from the piston rod to overlie and extend lengthwise of the outer surface of said cylinder, immediately thereof and at least in part in a biased bearing relation thereto, at such time the rod is retracted into the cylinder housing to the extent permitted by the connection defined between said bar element and the connection means applied to the rod.

11. Apparatus as in claim 10 characterized in that an acute angle is normally defined between said means defining said lateral projection and said means defining said bar shaped element.

12. Apparatus as in claim 11 characterized in that said acute angle approaches 90 degrees.

13. Apparatus as in claim 11 wherein said means defining said bar shaped element, said means defining said lateral projection and said means for connection of said last named means to a piston rod form part of a unitary structure which is substantially firm and stable but distinguished by said bar shaped element having a limited capability of flexing outwardly from said means defining said lateral projection.

14. Apparatus as in claim 13 wherein said means defining said bar shaped element has a portion thereof tapered in the direction of which serves, in the connection of said generally L-shaped structure to a piston rod, to provide, when the rod has a predetermined projection from the cylinder housing, a limiting abutment surface for maintaining a predetermined extension of said rod until said one end of said bar shaped element is flexed outwardly from the rod sufficient to clear the adjacent end of the housing from which the rod projects.

15. Apparatus for application to a projected portion of the piston rod of a control cylinder to limit its retraction into the housing of the cylinder of which it forms a part comprising a generally L-shaped structure, the shorter leg of which has in connection therewith means for a secure connection thereof in a substantialy radially projected relation to a portion of a length of a piston rod which is projected from the housing of a control cylinder of which it forms a part, said means for a secure connection of said shorter leg to a piston rod being defined by a notch in said shorter leg so formed that in the application thereof to said rod it is connected thereto with a pressured press fit, said legs having a connection therebetween providing a relative disposition thereof which in the secured connection of said shorter leg to the piston rod to which it applies inherently positions said longer leg to extend lengthwise of, alongside and immediately adjacent to the rod and, when the rod is sufficiently extended from said housing, to have at least a portion thereof substantially in contact with the facing surface of the rod, said L-shaped structure providing longitudinally spaced surface portions thereof which in the application of said structure to the rod are positioned in line with the end surface of the housing from which the rod projects and by reason of the secured connection thereof to the rod provide selective limits to the movement of the rod into its housing.

16. Apparatus as in claim 15 characterized in that said longer leg of said generally L-shaped structure is formed to have at least a portion thereof biased into a firm bearing relation to said rod when said secure connection of said shorter leg is achieved and the rod to which it is connected is sufficiently extended from the housing of the cylinder of which it forms a part.

17. Apparatus for application to a control cylinder to selectively limit and prevent the retraction of its piston rod into its housing comprising a structure including a relatively elongated leg and a short leg, said short leg including means for the coupling of said elongated leg to a portion of the length of the piston rod of the control cylinder to which it applies and means to limit the retraction of the piston rod into the housing of such cylinder, said elongated leg being constructed and arranged on said connection thereof to the control cylinder to position, in the retracted condition of the rod, in a closely coupled relation to the cylinder and to extend along the lengthwise of the housing immediately of its outer surface and to bear thereon in a biased relation thereto, at least in part, and upon a predetermined projection of said rod to automatically move inwardly of the housing of the control cylinder, on clearance thereof, to bear firmly on the piston rod beyond and immediately of the end of the housing from which the rod projects.

18. Apparatus as in claim 17 wherein said coupling means is connected to said elongated leg adjacent one end thereof and a portion of said elongated leg remote from said coupling means provides means for a limiting abutment thereof to the end of the cylinder housing from which the piston rod projects to prevent the retraction of the rod until such time said remote portion of said elongated leg is physically and positively displaced to clear said end of the cylinder housing.

19. Apparatus as in claim 17 wherein said short leg is notched to nest therein the portion of the piston rod to which it applies and includes means to resist its displacement therefrom.

20. Apparatus as in claim 17 wherein said elongated leg is normally inclined to and over said short leg to define therewith an angle which is less than 90°.

21. Apparatus as in claim 17 wherein said legs of said structure as applied to the control cylinder, when its piston rod is retracted to the extent possible, define therebetween an angle approaching 90°.

22. Apparatus as in claim 17 wherein said structure is an integrated structure and said legs are constructed and arranged to provide it with a substantially L-shaped configuration.

23. Apparatus as in claim 17 characterized in that said elongated leg has a taper along the length thereof, to the end thereof remote from said short leg.

24. Apparatus for application to a projected portion of the piston rod of a control cylinder to selectively limit its retraction into the housing of the cylinder of which it forms a part comprising a linearly directed component having an interconnected coupling means, said coupling means including means for the engagement thereof to a portion of the piston rod of a control cylinder to project laterally therefrom, said component being formed and so connected to said coupling means to position immediately of and lengthwise of the control cylinder in a biased relation thereto and adapted on the retraction of the piston rod to which it is coupled to extend over a portion of the length of the cylinder housing including that end from which the piston rod projects, to one side thereof, immediately of a portion of its outer surface, biased and at least in part in a firmly bearing relation thereto, said connection further providing means which on a predetermined projection of the piston rod produces a movement of said component outwardly with respect to the cylinder housing, and said component being so conditioned that immmediately on its clearing that end of the housing from which the rod projects it moves inwardly to and bears on the piston rod immediately of the end of the housing from which it projects to preclude further retraction of the rod until it is physically displaced to clear said end of the cylinder housing.

25. Apparatus as in claim 4 wherein said coupling means is connected to said linearly directed component adjacent one end thereof and, on said predetermined projection of the piston rod, a portion of said component remote from said coupling means provides means for a limiting abutment thereof to the end of the cylinder housing from which the piston rod projects to prevent the retraction of the rod until such time said remote portion of said component is physically and positively displaced to clear said end of the cylinder housing.

* * * * *

UNITED STATES PATENT AND TRADEMARK OFFICE
CERTIFICATE OF CORRECTION

PATENT NO. : 4,744,548                                        Page 1 of 2

DATED      : May 17, 1988

INVENTOR(S) : Richard C. Hathaway

It is certified that error appears in the above-identified patent and that said Letters Patent are hereby corrected as shown below:     On The Title Page:

Abstract, line 1, "An apparatus for" is corrected to read
            -- A new and improved apparatus for simply and
               effectively -- .

The following is inserted to form the end of the paragraph immediately preceding the heading "Summary of the Invention":
            -- none of which appears specifically pertinent,
               in construction or application, to that which
               is herein set forth and particularly
               claimed.--

Col. 2, line 44, "fixing" is corrected to read -- flexing --.

Col. 4, line 9, "and" is corrected to read -- of --.

Col. 5, line 2, -- end -- is inserted following "one".

Col. 6, line 7, "stabiliz" is corrected to read
               -- stabilized --.

Col. 7, line 44, "extend" is corrected to read -- extent --.

Col. 9, line 9, (claim 1, line 26) -- rod -- is inserted
               before "projects"

UNITED STATES PATENT AND TRADEMARK OFFICE
CERTIFICATE OF CORRECTION

PATENT NO. : 4,744,548

DATED : May 17, 1988

INVENTOR(S) : Richard C. Hathaway

It is certified that error appears in the above-identified patent and that said Letters Patent are hereby corrected as shown below:

Col. 10, line 10, (claim 9, line 6) "to" is corrected to read -- is --.

Col. 11, line 6, (claim 15, line 6) "substantialy" is corrected to read -- substantially -- .

Col. 11, line 47, (claim 17, line 13), "the" (first occurence) is corrected to read -- and --.

Col. 12, line 49, (claim 25, line 1), "4" is corrected to read -- 24 --.

Signed and Sealed this

First Day of November, 1988

Attest:

DONALD J. QUIGG

Attesting Officer

Commissioner of Patents and Trademarks